(12) United States Patent
Malka

(10) Patent No.: US 10,310,874 B2
(45) Date of Patent: Jun. 4, 2019

(54) FORMAL OBJECTS AND EXECUTORS

(71) Applicant: Lior Malka, San Bruno, CA (US)

(72) Inventor: Lior Malka, San Bruno, CA (US)

(*) Notice: Subject to any disclaimer, the term of this patent is extended or adjusted under 35 U.S.C. 154(b) by 163 days.

(21) Appl. No.: 15/186,460

(22) Filed: Jun. 18, 2016

(65) Prior Publication Data

US 2017/0364335 A1    Dec. 21, 2017

(51) Int. Cl.
*G06F 8/20*  (2018.01)
*G06F 8/30*  (2018.01)
*G06F 9/448* (2018.01)
*G06F 11/36* (2006.01)

(52) U.S. Cl.
CPC .............. *G06F 9/449* (2018.02); *G06F 8/24* (2013.01); *G06F 8/315* (2013.01); *G06F 8/316* (2013.01); *G06F 9/4488* (2018.02); *G06F 11/3668* (2013.01)

(58) Field of Classification Search
None
See application file for complete search history.

*Primary Examiner* — Francisco J Aponte
*Assistant Examiner* — Mark A Gooray

(57) ABSTRACT

Embodiments are provided for formal objects and executors. In one embodiment, a formal object serialization allows retrieving the object value using a Get method, writing the object value using a Write method, and reading the object value using a Read method. In one embodiment, a formal object validation uses a validator to validate assignments to the object value. Formal validation and serialization may be combined. In one embodiment, a formal executor is guaranteed to be closed regardless of whether an error has occurred or not.

6 Claims, 3 Drawing Sheets

FORMAL OBJECTS AND EXECUTORS

BACKGROUND

Computer programs rely on objects, which are structures that group together variables and may also include functions. A program may use thousands of objects during its execution. The program may instantiate the objects or read them from a stream. In both cases the object may contain illegal values. Unfortunately, most programs fail to generate an error when encountering illegal values or they do so incorrectly. This causes unexpected behavior and may further lead to resource leakage. In particular, executors, which represent thread pools, may not be shutdown, further exacerbating the problem. Programs with unexpected behavior can lead to substantial financial losses and service interruption.

SUMMARY

Embodiments are provided for formal objects and executors. In one embodiment, a formal object serialization allows retrieving the object value using a Get method, writing the object value using a Write method, and reading the object value using a Read method. The writing and reading logic may be provided to the object as input. In one embodiment, a formal object validation uses a validator sub-object and a metadata sub-object to validate assignments to the object value and detect type and content mismatches when reading the object from a stream. In one embodiment, a formal executor is closed in a try-with-resources statement regardless of whether an error has occurred or not.

DRAWINGS

The following figures illustrate the embodiments by way of example. They do not limit their scope.

DETAILED DESCRIPTION

This section includes detailed examples, particular embodiments, and specific terminology. These are not meant to limit the scope. They are intended to provide clear and through understanding, cover alternatives, modifications, and equivalents.

Computer languages provide variables and statements. Variables can be grouped to create objects, and statements can be grouped to create functions. An object may also include functions. For example, in the C programming language, a struct may be used to create an object. In the C++ and Java languages a class may be used to create an object. Objects can be defined even in languages that do not explicitly support objects, such as Assembly.

An object may have a constructor, which is a function that executes when the object is instantiated. The constructor may or may not initialize internal variables. An object may or may not expose internal variables. An object may provide direct access to internal variables, or provide functions that set the internal variables, or return the internal variables, or any combination of those. An object may be composed from any number of other objects of any type, including its own type. The internal objects are called sub-objects. A sub-object may be provided to the object or the object may instantiate the sub-object.

Serialization involves the formatting of data so that it can be transmitted or stored. Objects may have a writing logic that writes the object into a stream and a reading logic that reads an object from a stream. The writing and reading logic may or may not be part of the object. Streams are an abstraction for representing files, network connections, memory buffers, and so on.

An executor is an object that represents a pool of one or more threads. Tasks submitted to the executor are executed by threads in the pool. Any executor, threads, and tasks may be used. Tasks may or may not be placed in a queue. Any policy for creating or removing threads may be used. When an executor is shut down, new tasks cannot be submitted, and existing tasks are terminated. Termination may or may not be guaranteed.

A try-catch statement is a feature for error handling. Any try-catch statement and variants thereof can be implemented in low and high level programming languages. A try-catch statement has one Try clause and at least one Catch clause. If an error occurs in the Try clause, then a Catch clause for that error is executed. Any logic can be used in the Try and Catch clauses. A try-catch statement may or may not have a Finally clause. A try-with-resources statement is a try-catch statement that allows declaring closeable objects in the try clause, and guarantees that these objects will be closed after the statement completes. A closeable object is an object that implements the close method.

Figure 1:
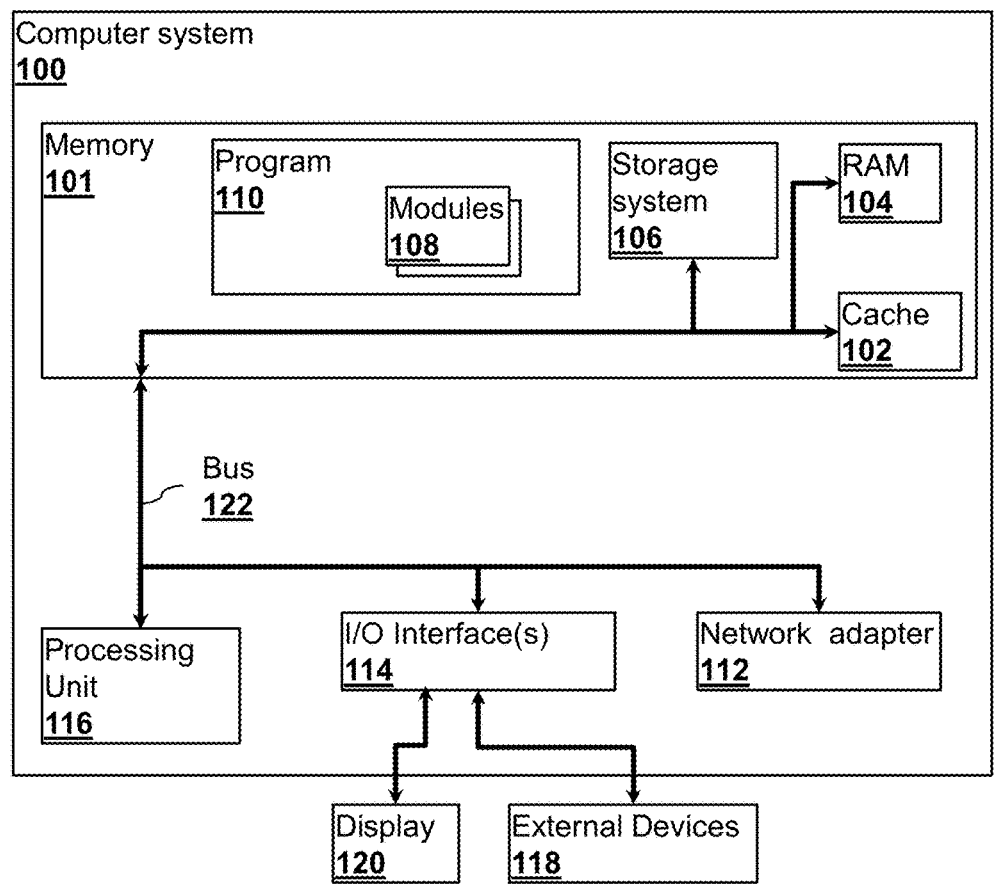
FIG. 1 shows a flow diagram of a method of formal object serialization, in accordance with one embodiment.

FIG. 1 shows a flow diagram of a method of formal object serialization, in accordance with one embodiment. The object is initialized with input 100. The object sets a Boolean Readable variable 104 to a value specified in the input. If Readable is FALSE, then the object sets a Value variable 102 to a value specified in the input. The value may be null. The object provides a Get method 106 that returns Value if Readable is FALSE and returns an error otherwise. The object provides a Write method 108 that writes Value to a stream if Readable is FALSE and returns an error otherwise. The object provides a Read method 110 that generates an error if Readable is FALSE. Otherwise, the Read method sets Readable to be FALSE and sets Value based on data read from a stream. The Readable variable may be eliminated, allowing multiple invocations of Read and removing the error returned by the Get and Write methods.

The object may be further equipped with a validator sub-object for validating values assigned to the Value variables and returning an error if an invalid value is encountered.

The object may be further equipped with a ToString method that displays some of the internal values of the object. The object may be used in composition.

Figure 2:
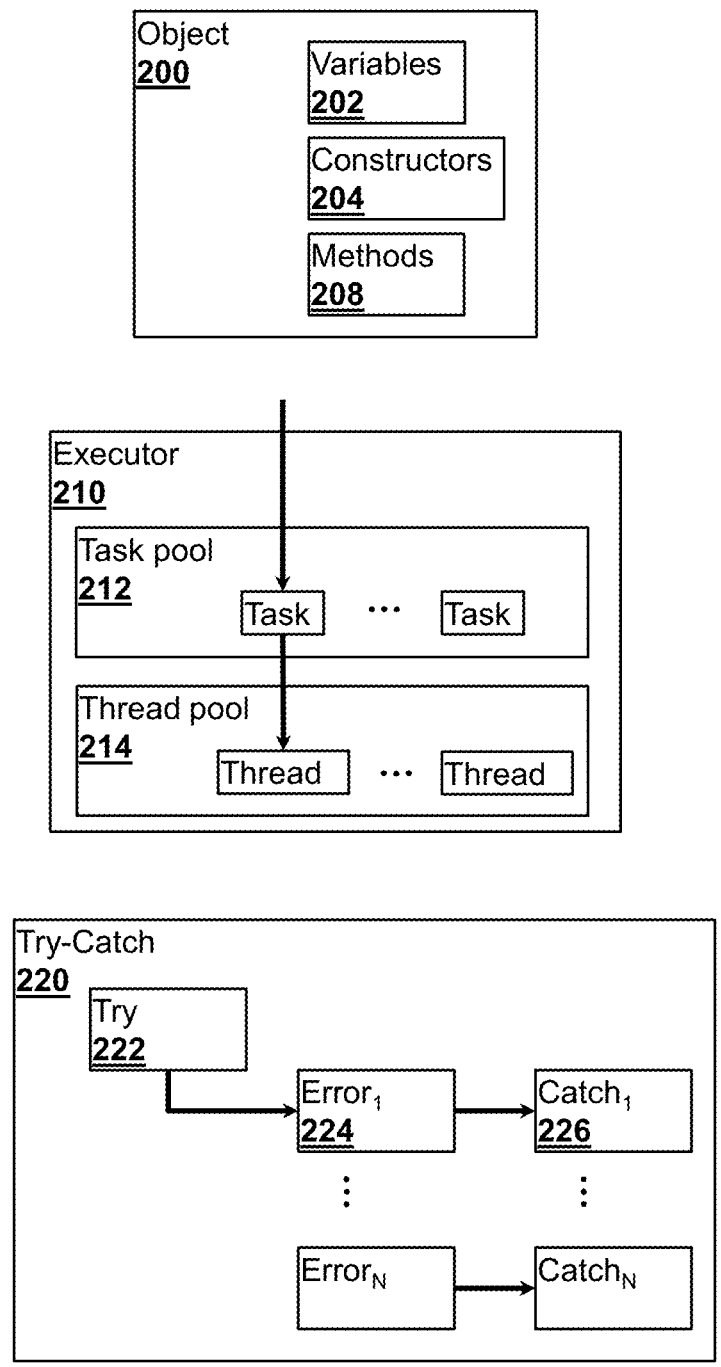
FIG. 2 shows a flow diagram of a method of formal object validation, in accordance with one embodiment.

FIG. 2 shows a flow diagram of a method of formal object validation, in accordance with one embodiment. The object is initialized with input 200. The object has a Value variable 102. The object may or may not have the Get method 106, Write method 108, and Readable variable 104 shown in FIG. 1. The object has a validator sub-object 202 and a metadata sub-object 204. The object may construct the validator and metadata sub-objects or they may be included in the input. Before assigning a value to the Value variable, the object uses the validator sub-object to validate the value. An error occurs if the value is invalid. Otherwise, the value is assigned to the Value variable.

The object provides a Read method 110 that uses the metadata sub-object to determine the kind and amount of data that should be read from a stream. The Read method returns an error if data read from the stream is inconsistent with the metadata sub-object. If the Read method returns a value from the stream, then the value is validated and, if valid, then it is assigned to the Value variable.

The metadata sub-object may be eliminated if the amount of data to be read is predetermined. For example, when the object represents a number, a fixed number of bytes are read. Similarly, the metadata sub-object may be substituted with a non-object type. For example, if the metadata describes the length of a string, then a number describing the length of the string may substitute the metadata sub-object.

In an example, the object may represent a byte array, and the validator and metadata sub-objects may specify that the array may not be null and may not exceed 20 bytes in length. Hence, an error occurs if a null array is provided in the input, or if the Read method reads a null array or an array whose length is greater than 20 bytes.

The object may be further equipped with a ToString method that displays some of the internal values of the object. The object may be used in composition.

Figure 3:
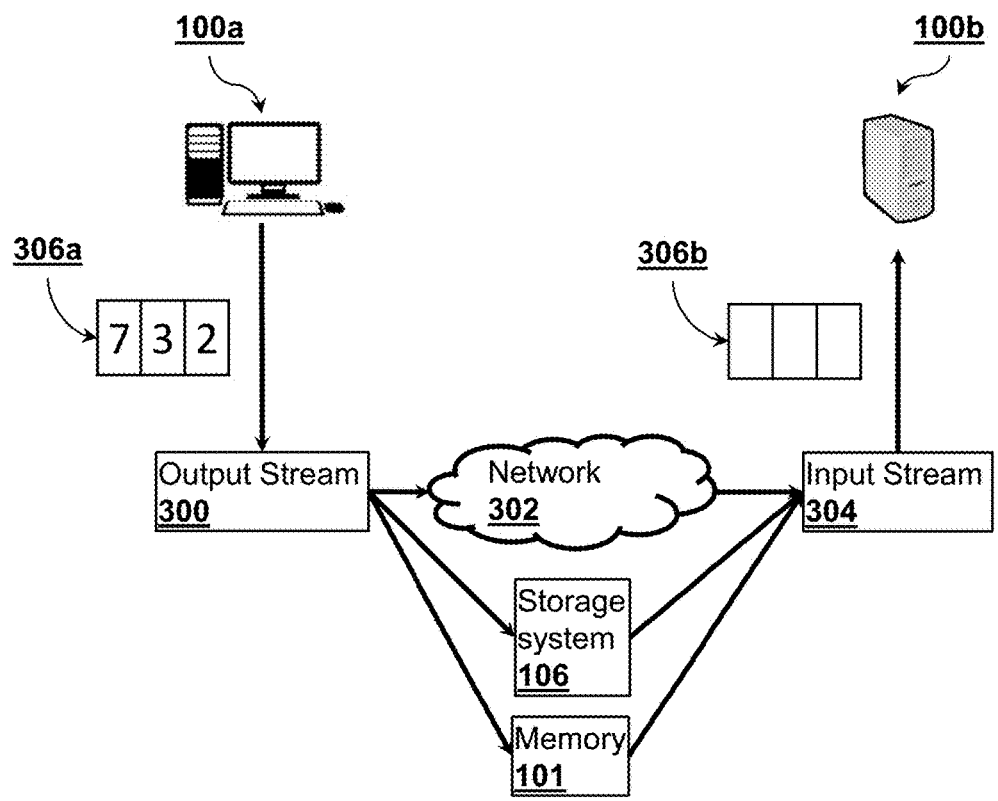
FIG. 3 shows a flow diagram of a method of a formal executor, in accordance with one embodiment.

FIG. 3 shows a flow diagram of a method of a formal executor. A close method 300 closes an executor 302 by invoking the shutdown method of the executor. Any executor may be used. The resulting object is a closeable executor 304. The closeable executor is instantiated by a thread 306 using a try-with-resources 308 statement. The thread submits 310 tasks to the closeable executor within the try-with-resources statement, and invokes a method that waits 312. Any method of waiting may be used. The waiting method blocks either indefinitely, or until a condition has been met. For example, the thread may sleep, or it may wait for one of the threads in the executor to complete, or it may wait for the executor to terminates, or any other condition.

An error may occur while the try-with-resources clause is executed. The error may occur when the thread is waiting, such as when the thread is interrupted, or it may occur before or after waiting. The try-with-resources clause may also complete without errors. In all cases the try-with-resources clause would close the executor, which terminates all threads of the executor.

In an example, a thread may instantiate in a first try-with-resources statement a first closeable executor with a pool of size one, submit one task to the executor, and sleep. The task may instantiate, within a second try-with-resources statement, a second closeable executor with a pool that grows dynamically, submit a plurality of subtasks to the second executor, and sleep. If the thread is interrupted, the sleep method generates an error, causing the first executor to close and hence to shut down. The shutdown interrupts the sleeping task, causing the second executor to close and hence to shut down. This terminates the subtasks.

What is claimed is:

1. A method of ensuring a Value variable of a program is initialized correctly, the method being performed on an object having a get method, a write method and a read method, wherein the method performs the steps of:
   receiving an input and initializing the object with the input, wherein said input comprises an initial value for a Boolean Readable variable, a call to one of the methods within the object and a value for the Value variable that is only initialized if the Boolean Readable is FALSE;
   based on the call associated with the input, performing the steps of:
   if the call of the input is a Read method call;
      executing the Read method on a stream that when invoked returns an error if Readable is FALSE, and otherwise sets the Readable to FALSE and sets the Value variable to a value read from the stream;
   if the call of the input is a Get method call,
      executing the Get method that returns the Value variable if Readable is FALSE, otherwise return an error; and
   if the call of the input is a Write method call,
      executing the Write method that writes the value to a stream if Readable is FALSE, otherwise return an error.

2. The Method of claim 1, further comprising using a validator sub-object for validating values assigned to the Value variable and returning an error if a value is invalid.

3. The Method of claim 1, wherein the Read method uses a metadata sub-object to determine the kind and amount of data that should be read from the stream and returning an error if data read from the stream is inconsistent with the metadata sub-object.

4. The Method of claim 1, further comprising providing a Set method that sets the value of the Value variable.

5. The Method of claim 1, wherein the Write and the Read methods are implemented as sub-objects and are constructed by the object or provided as input to the object.

6. The Method of claim 1, wherein the Readable variable is eliminated.

* * * * *